March 2, 1954     R. B. COTTRELL     2,670,856
DRAFT GEAR
Filed May 19, 1948                                  4 Sheets-Sheet 1
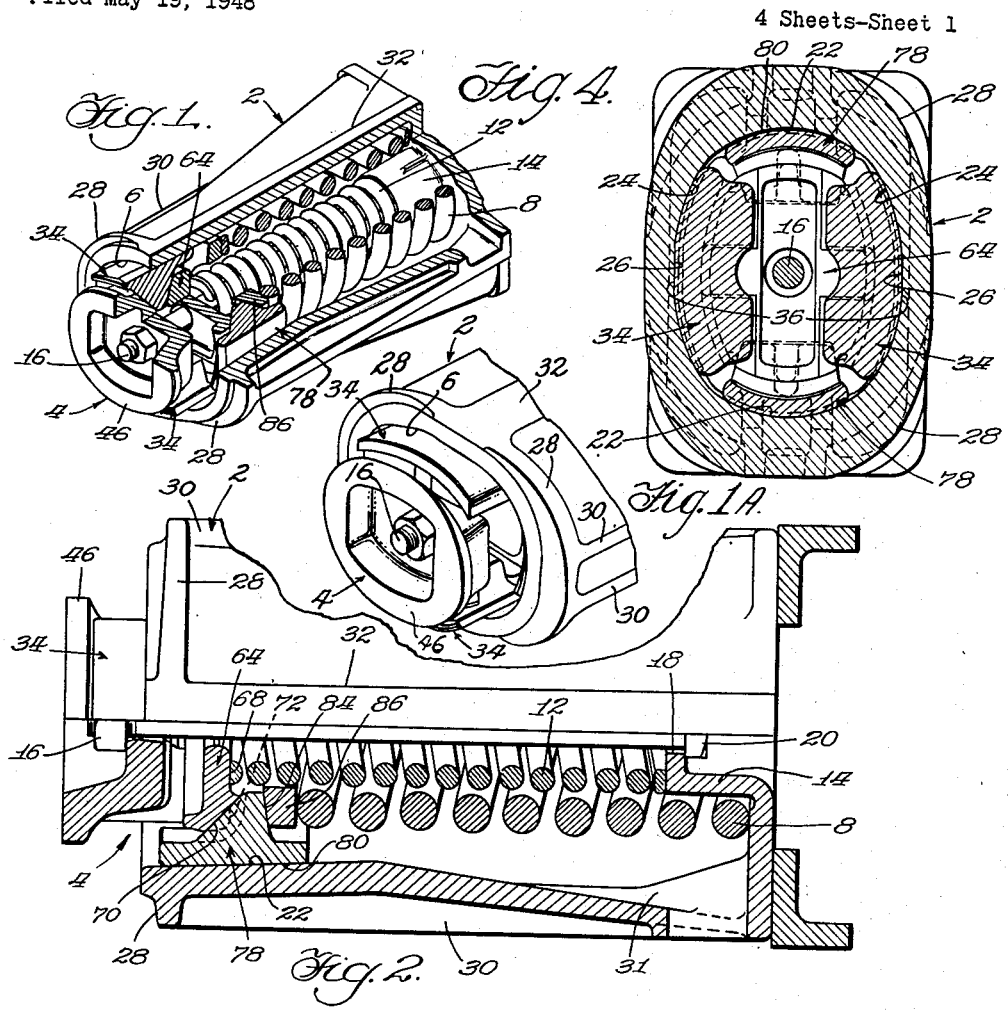
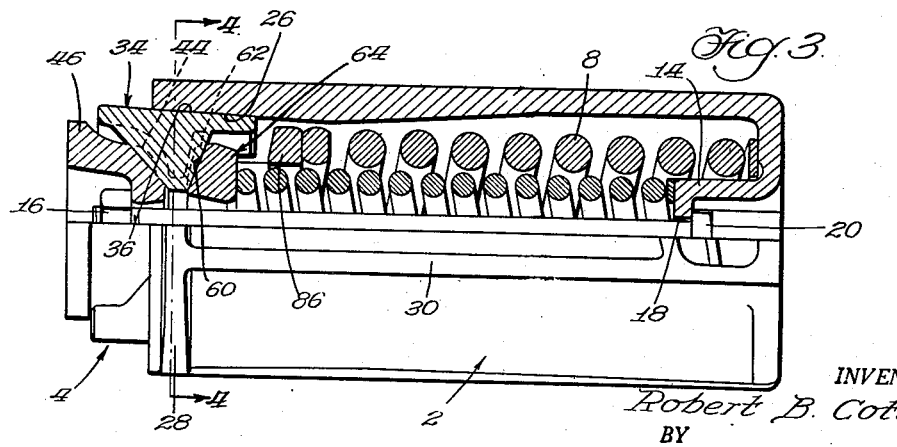
INVENTOR.
Robert B. Cottrell
BY March 2, 1954  R. B. COTTRELL  2,670,856
DRAFT GEAR
Filed May 19, 1948  4 Sheets-Sheet 2
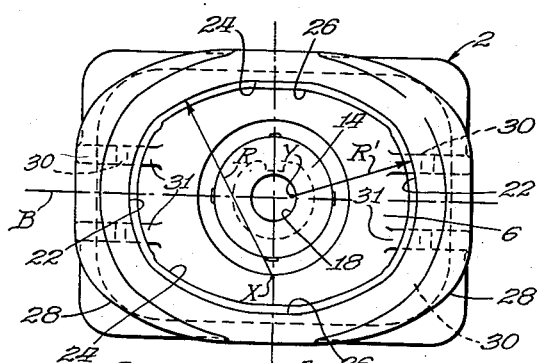
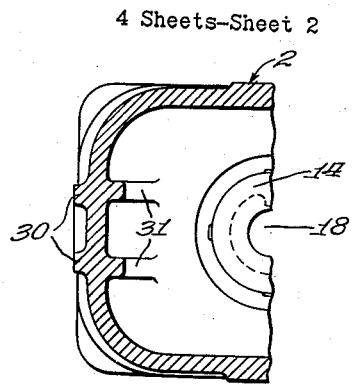
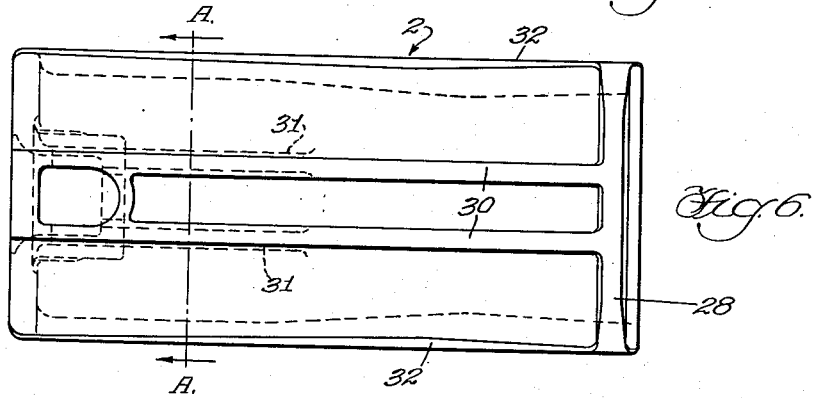
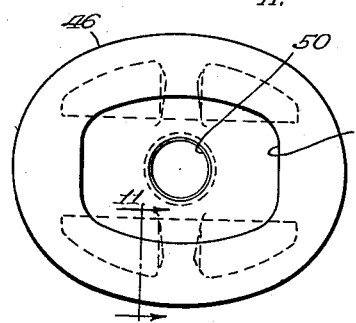
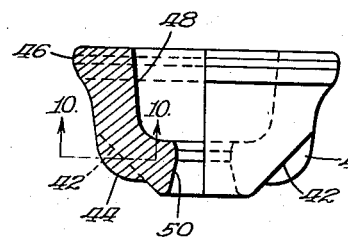
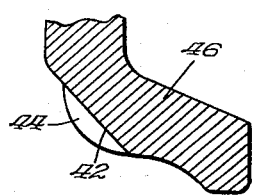
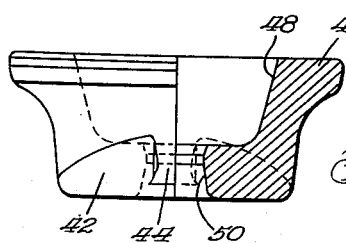
INVENTOR.
Robert B. Cottrell
BY
Orrin O. B. Garner
Atty March 2, 1954

R. B. COTTRELL 2,670,856

DRAFT GEAR

Filed May 19, 1948

INVENTOR.
Robert B. Cottrell
BY
Ann O. B. Garner
Atty.

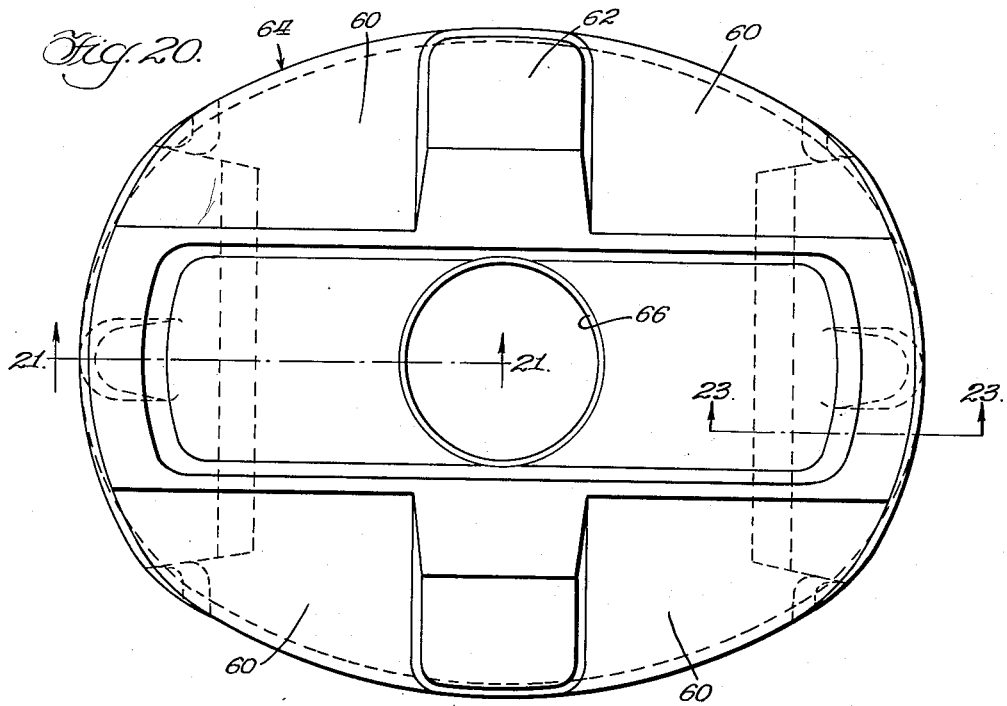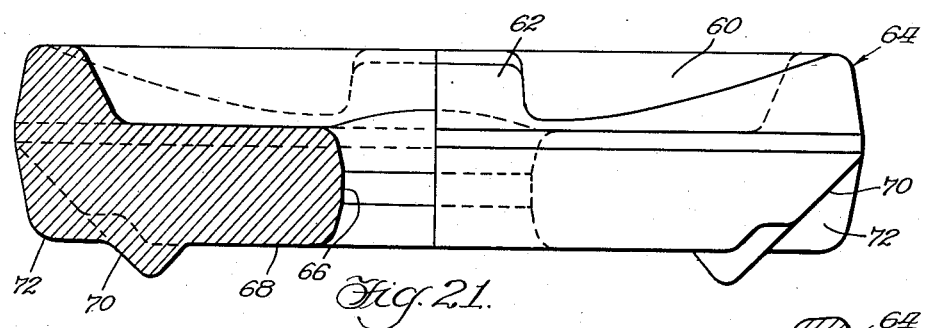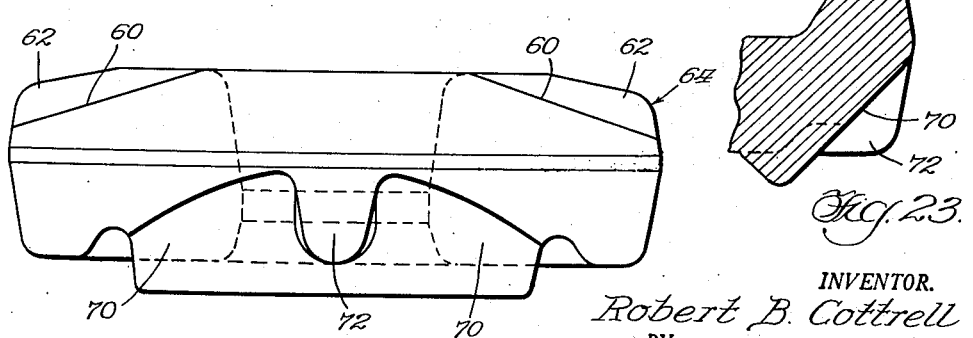

Patented Mar. 2, 1954

2,670,856

UNITED STATES PATENT OFFICE 2,670,856

DRAFT GEAR

Robert B. Cottrell, Chicago, Ill., assignor to American Steel Foundries, Chicago, Ill., a corporation of New Jersey Application May 19, 1948, Serial No. 28,011

2 Claims. (Cl. 213—32)

This invention relates to railway draft gears and more particularly to a gear of economical and sturdy construction having the characteristic of relatively great capacity and quick release.

A general object of the invention is to devise a draft gear wherein a friction mechanism is operable within the flared end of a steel housing which is capable of expansion and contraction without permanent deformation during compression and release respectively, of said mechanism.

A more specific object of the invention is to devise a draft gear housing, such as above described, wherein the open friction end is generally oval in shape and is reinforced by a pair of opposed C-shaped external flanges arranged in alignment along the long axis of the open end of the housing, the flanges acting as spring means to yieldingly resist expansion of the housing as the friction mechanism is urged into the open end thereof under the severe impacts of railway service.

A further object of the invention is to devise a draft gear wherein a plurality of friction shoes are arranged in series and are interlocked with each other and with the housing against relative rotational movement to insure quick release.

Still another object of the invention is to provide an equalizer between the inner and outer friction shoes and having wedge faces engageable with the inner friction shoes along surfaces extending axially inwardly of a spring seat on the equalizer cooperating with associated resilient means in the housing to resist compression of the gear.

Still another object of the invention is to provide a quick releasing gear of the series type by a novel arrangement of wedge faces between the various part of the friction mechanism.

The foregoing and other objects and advantages of the invention will become apparent from a consideration of the following specification and the accompanying drawings, wherein:

Figure 1 is a perspective view of a draft gear embodying the invention with portions of the device broken away to clarify the construction;

Figure 1A is a fragmentary perspective view of the forward end of the gear;

Figure 2 is a side elevational view partly in section of the gear shown in Figure 1;

Figure 3 is a side elevational view partly in section taken from the bottom of Figure 2;

Figure 4 is a sectional view taken on the line 4—4 of Figure 3;

Figure 5 is a plan view of the housing taken from the open end thereof;

Figure 6 is a side elevational view of the housing;

Figure 6A is a fragmentary sectional view on the line A—A of Figure 6;

Figure 7 is a plan view of the outer wedge follower;

Figure 8 is a side elevational view partly in section taken from the bottom of Figure 7;

Figure 9 is a side elevational view partly in section taken from the right of Figure 7;

Figure 10 is a sectional view taken on the line 10—10 of Figure 9;

Figure 11 is a sectional view on the line 11—11 of Figure 7;

Figure 12:
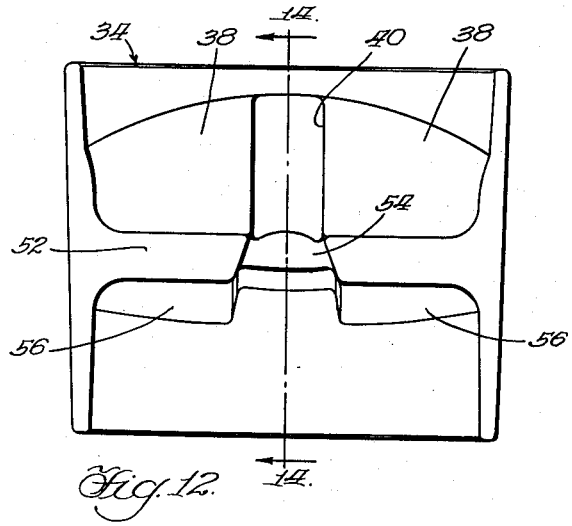
Figure 14:
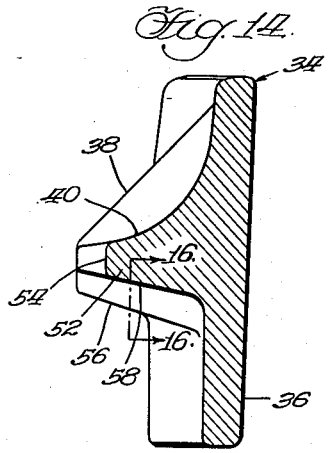
Figure 13:
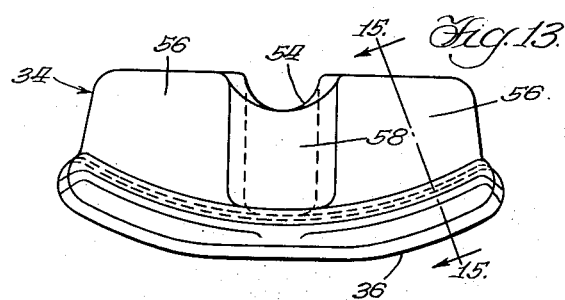
Figure 15:
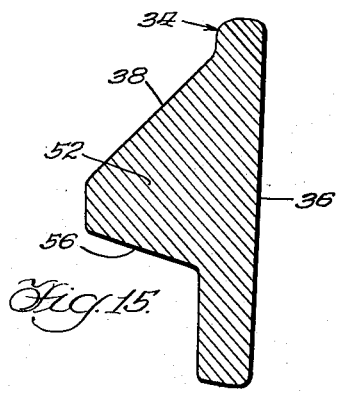
Figure 17:
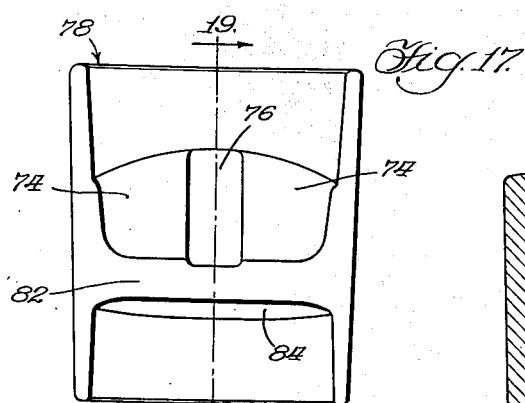
Figure 16:
Figure 18:
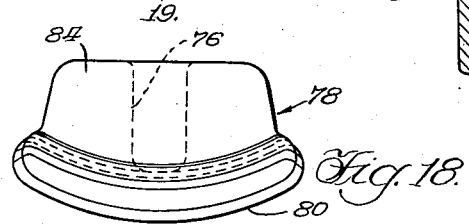
Figure 19:

Figures 12 to 16 illustrate in detail one of the outer friction shoes, Figure 12 being a side elevational view thereof from the inner face thereof, Figure 13 being a plan view taken from the bottom of Figure 12, Figure 14 being a sectional view taken on the line 14—14 of Figure 12, Figure 15 being a sectional view taken on the line 15—15 of Figure 13, and Figure 16 being a sectional view on the line 16—16 of Figure 14;

Figures 17 to 19 inclusive, show in detail one of the identical inner friction shoes, Figure 17 being a side elevational view taken from the radially inner face thereof, Figure 18 being a plan view taken from the bottom of Figure 17, and Figure 19 being a sectional view on the line 19—19 of Figure 17; and Figures 20 to 23 inclusive, illustrate the equalizer in detail, Figure 20 being a plan view taken from the axially outer face thereof, Figure 21 being a side view, the right half thereof being in elevation and the left half being in section on the line 21—21 of Figure 20, Figure 22 being a side elevational view taken from the right of Figure 20, and Figure 23 being a sectional view on the line 23—23 of Figure 20.

Describing the invention in detail and referring first to the perspective view of Figure 1, the novel gear comprises a housing, generally designated 2, with a friction mechanism, generally designated 4, receivable within the open end 6 of the housing. Movement of the friction mechanism 4 into the housing is resisted by friction developed thereagainst, as hereinafter described, and by an outer coil spring 8 seated against the closed end of the housing and an inner coil spring 12 seated on a spring support boss 14 formed on the inner end of the housing. The parts are held in assembled relationship by a bolt and nut assembly 16 which, as best seen in Figures 2 and 3, extends through the inner spring 12 through an opening 18 in the boss 14 and comprises a head 20 engageable with the boss to limit the release stroke of the clutch mechanism.

The housing 2 is generally oval in shape, as best seen in Figures 1, 4, and 5, and comprises the before-mentioned open end 6 having friction surfaces 22 arranged along the long axis thereof and friction surfaces 24 arranged along the short axis thereof, as best seen in Figures 4 and 5. Each of the friction surfaces 24 comprises a flat area 26 disposed intermediate spaced arcuate areas to prevent relative rotation of the associated shoes, as hereinafter discussed.

The housing 2 is shown in detail in Figures 5, 6, and 6A and, as above noted, comprises a generally oval friction end having a short axis A (Figure 5) and a long axis B. The arcuate portions of each friction surface 24 which is disposed at one side of the long axis B are struck from a common center disposed at the opposite side of the long axis along a radius, indicated at R. Each friction surface 22, as shown in Figure 5, is disposed at one side of the short axis A and is struck from a center Y at the same side of the axis A along a radius designated R'. This novel arrangement of friction surfaces has been found to develop adequate friction while maintaining the friction mechanism 4 against relative rotation with respect to the housing, as hereinafter discussed.

The housing 2 at its open end is formed with a pair of opposed C-shaped flanges 28 arranged along the long axis thereof, each of said flanges being reinforced centrally thereof by longitudinal ribs 30 and being reinforced at its respective ends by longitudinal ribs 32 (Figures 1, 2 and 6).

The housing 2 is also reinforced at its closed end by a pair of internal flanges or ribs 31, as best seen in Figures 2 and 6A, the ribs 31 being in alignment with the overlapping ends of the ribs 30.

This construction controls elastic deformation of the housing as the friction mechanism 4 is urged into the open end 6 thereof during compression of the gear, and the C-shaped flanges 28 act as springs to yieldingly resist such deformation and to prevent permanent distortion of the housing. In this connection it may be noted that in a gear of the above-described type, as is well known to those skilled in the art, the housing expands as the friction mechanism is urged into the same under the severe impacts of railway service and after pressure against the friction mechanism has been relieved, contraction of the housing acts in combination with the springs 8 and 12 to urge the mechanism outwardly to the release position illustrated in the drawings. As above mentioned, it has been found that the spring flanges 28 accommodate the necessary contraction and expansion of the housing and prevent permanent distortion thereof. The flanges 28 are preferably tapered toward the short axis of the housing to reduce bending stresses along the surfaces 24.

The clutch mechanism 4 comprises a pair of substantially identical outer shoes 34, one of which is shown in detail in Figures 12 to 16 inclusive. Each outer shoe comprises a friction face 36 complemental to and engaged with the related housing surface 26, as best seen in Figures 3 and 4, and the shoe also comprises spaced axially outer wedge faces 38 and an intermediate groove 40 engaged respectively with complementary wedge faces 42 and an intermediate tongue 44 of an outer wedge follower 46, shown in detail in Figures 7 to 11 inclusive. The outer wedge follower comprises a central recess 48 and an opening 50 accommodating the before-mentioned bolt and nut assembly 16.

Each outer shoe 34 comprises a ledge 52 on its radially inner surface formed with the before-mentioned recess 40 and having an arcuate recess 54 accommodating the before-mentioned bolt and nut assembly 16. The ledge is formed on its axially inner surface with spaced wedge surfaces 56 and an intermediate groove 58 in engagement respectively with spaced wedge surfaces 60 and an intermediate tongue 62 on an equalizer 64, shown in detail in Figures 20 to 23 inclusive, and including a central opening 66 accommodating the bolt and nut assembly 16.

The equalizer 64 comprises a spring seat 68 on its axially inner surface bearing against the spring 12 and comprises spaced tongues having wedge faces 70 and an intermediate tongue 72 engaged respectively with complementary wedge faces 74 and an intermediate groove 76 of an inner friction shoe 78, shown in detail in Figures 17 to 19 inclusive. The tongue surfaces 70 extend axially inwardly of the seat 68 to afford maximum bearing against surfaces 74, without encroaching on the space available for spring 12.

The inner shoes 78 comprise radially outer friction surfaces 80 engaged with the friction surfaces 22 of the housing, as best seen in Figures 2 and 4. Each shoe also comprises a ledge 82 on its radially inner surface formed with the above-mentioned groove 76. The ledge 82 is formed with a wedge surface 84 on its axially inner surface having complementary wedge engagement with a spring cap 86 (Figures 2 and 3). The spring cap bears against the spring 8 which acts in parallel with the spring 12 to resist the compression stroke of the gear.

Thus it will be seen that the novel draft gear, above described, comprises a friction mechanism wherein the inner and outer shoes are arranged in series and the intermediate equalizer as well as the outer wedge follower are interlocked against relative rotational movement by means accommodating relative movement of the parts axially of the gear to facilitate quick release, and the outer set of shoes are similarly interlocked with the housing. Also the novel gear comprises resilient means in the form of opposed C-shaped flanges disposed around the outer perimeter of the housing at the friction end thereof for controlling elastic deformation of the housing on the compression stroke of the gear and for contracting the housing to urge the friction shoes outwardly of the open end thereof on the release stroke of the gear. A further feature of the novel device is the manner in which the various parts of the wedge mechanism are engaged along wedge surfaces affording maximum wedge area without encroaching upon the available space for the spring means in the housing acting on the clutch mechanism.

I claim:

1. A draft gear comprising a housing with an open friction end, a friction mechanism in said open end comprising a pair of outer shoes, a pair of inner shoes, equalizer means between said pairs of shoes, outer wedge means in wedge engagement with the outer shoes, spring means for yieldingly resisting movement of said friction mechanism into said housing on compression of the gear, said spring means comprising a spring acting on the inner shoes, and another spring bearing against a spring seat on the equalizer, said equalizer being in wedge engagement with the outer shoes and in wedge engagement with the inner shoes along complementary wedge tongues of the inner shoes and equalizer projecting axially inwardly of said spring seat.

2. A draft gear comprising a housing with an open friction end, a friction mechanism therein comprising a pair of outer shoes, a pair of inner shoes, equalizer means therebetween in wedge engagement with the outer shoes, said equalizer having tongues projecting axially inwardly thereof in wedge engagement with the inner shoes, means for yieldingly resisting movement of the friction mechanism into said housing comprising spring means acting against a spring seat on said equalizer means, said seat being disposed axially outwardly of the inner ends of the tongues and the inner shoes.

ROBERT B. COTTRELL.

References Cited in the file of this patent

UNITED STATES PATENTS

| Number | Name | Date |
|---|---|---|
| 1,044,077 | O'Connor | Nov. 12, 1912 |
| 1,241,156 | Sherman | Sept. 25, 1917 |
| 1,597,444 | Geiger | Aug. 24, 1926 |
| 1,616,757 | O'Connor | Feb. 8, 1927 |
| 1,620,634 | Dentler | Mar. 15, 1927 |
| 2,207,287 | Cottrell | July 9, 1940 |
| 2,222,479 | Cottrell | Nov. 19, 1940 |
| 2,238,083 | Sproul | Apr. 15, 1941 |
| 2,238,220 | Gallagher | Apr. 15, 1941 |